(12) United States Patent
Aaron (10) Patent No.: US 7,711,518 B2
(45) Date of Patent: May 4, 2010

(54) METHODS, SYSTEMS AND COMPUTER PROGRAM PRODUCTS FOR PROVIDING SYSTEM OPERATIONAL STATUS INFORMATION

(75) Inventor: Jeffrey A. Aaron, Atlanta, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 1154 days.

(21) Appl. No.: 10/963,251

(22) Filed: Oct. 12, 2004

(65) Prior Publication Data

US 2006/0041794 A1 Feb. 23, 2006

Related U.S. Application Data

(63) Continuation-in-part of application No. 10/924,072, filed on Aug. 23, 2004.

(51) Int. Cl.
*G06F 12/14* (2006.01)

(52) U.S. Cl. .......................... 702/182; 702/188; 726/25

(58) Field of Classification Search .................. 702/108, 702/121–123, 176, 178, 182–188; 340/3.1, 340/3.3, 3.31, 3.32, 3.4, 3.42, 3.43, 3.44, 340/3.6, 3.61, 3.62, 3.63, 3.9; 726/3, 6, 7, 726/22–25; 714/39, 47, 48
See application file for complete search history.

(56) References Cited

U.S. PATENT DOCUMENTS

| | | | | |
|---|---|---|---|---|
| 7,117,531 | B2 * | 10/2006 | Fukasawa | 726/22 |
| 7,165,241 | B2 * | 1/2007 | Manda et al. | 717/124 |
| 7,325,252 | B2 * | 1/2008 | Bunker et al. | 726/25 |
| 2003/0058096 | A1 * | 3/2003 | Shteyn | 340/531 |

* cited by examiner

*Primary Examiner*—Manuel L Barbee
(74) *Attorney, Agent, or Firm*—Myers Bigel Sibley & Sajovec, P.A.

(57) ABSTRACT

Methods for providing operational status information associated with a distributed application environment can include monitoring performance of actions occurring on separate components in a distributed application environment in response to a requested operation to determine operational status information of the distributed application environment based on reports provided by the separate components. Related systems and computer program product are also disclosed.

43 Claims, 7 Drawing Sheets

METHODS, SYSTEMS AND COMPUTER PROGRAM PRODUCTS FOR PROVIDING SYSTEM OPERATIONAL STATUS INFORMATION

RELATED APPLICATION

This application is a continuation-in-part of U.S. patent application Ser. No. 10/924,072 entitled "METHODS, SYSTEMS AND COMPUTER PROGRAM PRODUCTS FOR PROVIDING APPLICATION SERVICES TO A USER" by Aaron, filed Aug. 23, 2004, which is incorporated herein by reference as if set forth in its entirety.

FIELD OF THE INVENTION

This invention relates to computing devices, and more particularly to such devices supporting a variety of different applications.

BACKGROUND OF THE INVENTION

It is known to provide a web server ("server") on the Internet which can enable a web client ("client") and the server to interact over the world wide web (WWW), in an environment commonly referred to as "Web services." Web services are increasingly based on shared and open technology standards and protocols, such as SOAP (Simple Object Access Protocol), UDDI (Universal Description, Discovery and Integration), and WSDL (Web Service Definition Language). Web services can communicate, interact, and integrate with heterogeneous applications, irrespective of their implementation formats to facilitate dynamic integration between businesses, suppliers, partners, and customers. A web Service, or the provision of a web service, may thus be composed of multiple interactions between modular applications or component services.

In particular, Web services use a generic approach to requesting and providing services so that, for example, the services can be provided without a user having direct knowledge of which service provider is responding to a request for service. In other words, the client may request service from a Web service provider without the user knowing which provider, or which one or set of components services, is actually used by the client. These may in effect be hidden from the user. Further, the Web services approach may allow for the addition of new services (along with the replacement or removal of existing services) in an opaque manner such that the user is unaware of changes in the Web services. The user of a web service may in may cases only be aware of the interface to that service, being unaware of the behind-the-scenes interactions, applications, component services, and sequence of events or capabilities being accessed in the web services distributed environment/system to provide a response to the client.

With the proliferation of Web services, there is an increased challenge to provide operational integrity and security given the open and distributed nature of such services. For example, many approaches along these lines may only highlight/detect/identify/comprehend operational or security issues after the problems have occurred, which may cause system instability, which may otherwise have been prevented or reduced if known in advance. Furthermore, these operational and/or security issues may be complicated in the Web services approach discussed above due to the multiple interactions between component services as well as addition and removal of new services, which can cause instabilities due to services operating according to different versions of the different protocols and languages discussed above. Accordingly, there is a need for further improvements related to the interoperation of services provided, for example, via the World Wide Web.

SUMMARY OF THE INVENTION

Embodiments according to the invention can provide methods, systems and computer program products for providing system operational status information. Pursuant to these embodiments, a method for providing operational status information associated with a distributed application environment can include monitoring performance of actions occurring on separate components in a distributed application environment in response to a requested action to determine operational status information of the distributed application environment based on reports provided by the separate components.

In some embodiments according to the invention, monitoring the performance of actions can include determining the operational status information based on separate verification and security reports associated with the separate components. In some embodiments according to the invention, the separate verification and security reports are respective separate verification and security scores. In some embodiments according to the invention, determining the operational status information based on separate verification and security scores can include determining the separate verification and security scores based on separate verification and security reports provided by the separate components.

In some embodiments according to the invention, the separate verification and security scores are respective numerical scores that are directly or indirectly proportional to separate verification and security status. In some embodiments according to the invention, monitoring performance of actions can further include determining the operational status information based on hierarchical reporting by the separate components. In some embodiments according to the invention, the reports can include interim reports indicating operational status information associated with performance of the action before completion of the action by respective ones of the separate components and final reports indicating operational status information associated with performance of the action after completion of the action by the respective ones of the separate components.

In some embodiments according to the invention, the method can further include determining intermediate and final verification and security scores for the distributed application environment based on interim reports from different components. In some embodiments according to the invention, the verification reports can be objective parameters of processor usage, execution time, exception occurrences, time outs, context information and/or message flow state information, which can include transaction-based state information.

In some embodiments according to the invention, the security reports can be objective parameters of failed login attempts, user identifiers, application usage information, current configuration, active functions/capabilities, system impairment/crash information, and/or message flow state information. In some embodiments according to the invention, determining the verification score is based on mapping the objective parameters using historical data and/or rule based data. In some embodiments according to the invention, the method can further include determining the security score based on mapping the objective parameters using historical security event/violation data, pattern matching and/or rule based data.

In some embodiments according to the invention, the method can further include evaluating the security score against a security threshold value and activating a security alarm if the security score exceeds the security threshold value. In some embodiments according to the invention, the security threshold is modified based on the verification score. In some embodiments according to the invention, the security threshold is modified based on a request type. In some embodiments according to the invention, a final overall score is determined by combining the verification score and the security score.

DETAILED DESCRIPTION OF EMBODIMENTS ACCORDING TO THE INVENTION

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The present invention is described below with reference to block and flowchart illustrations of methods, apparatus (systems) and/or computer program products according to embodiments of the invention. It is understood that each block of the diagrams, and combinations thereof, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block or blocks.

The invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

It will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure.

Figure 1:
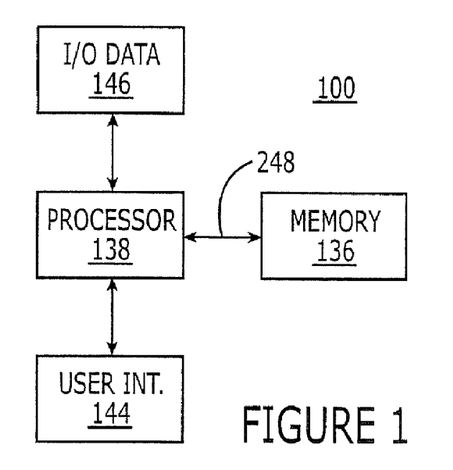
FIG. 1 is a block diagram that illustrates a processing component used to perform actions according to some embodiments of the invention.

FIG. 1 illustrates an exemplary processing component (or component) 100 configured in accordance with some embodiments of the invention. The component 100, which may be incorporated in, for example, a personal computer, a PDA, a wireless terminal/phone, a smart appliance or the like, may include a user interface 144, including, for example, input device(s) such as a keyboard or keypad, a display, a speaker and/or microphone, and a memory 136 that communicate with a processor 138. The component 100 may further include an I/O data port(s) 146 that also communicates with the processor 138. The I/O data ports 146 can be used to transfer information between the component 100 and another component 100 or a network using, for example, an Internet protocol (IP) connection. These components may be conventional components such as those used in many conventional data processing systems, which may be configured to operate as described herein.

Figure 2:
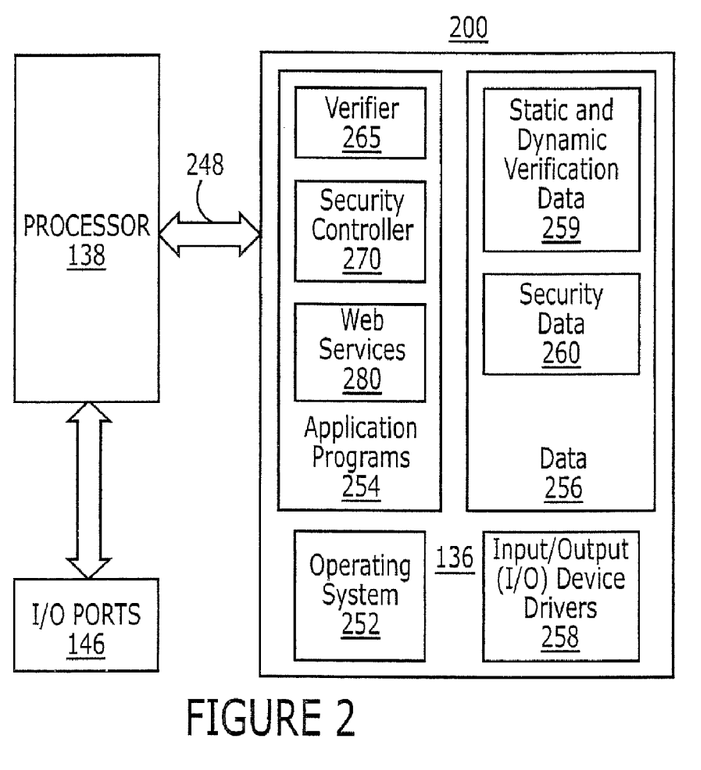
FIG. 2 is a block diagram that illustrates a processing component including verification and security functions according to some embodiments in the invention.

FIG. 2 is a block diagram of a component 200 for providing services to a user according to systems, methods, and computer program products in accordance with some embodiments of the invention. The processor 138 communicates with the memory 136 via an address/data bus 248. The processor 138 can be any commercially available or custom microprocessor, microcontroller, digital signal processor or the like. The memory 136 may include any memory devices containing the software and data used to implement the functionality of the component 200. The memory 136 can include, but is not limited to, the following types of devices: ROM, PROM, EPROM, EEPROM, flash memory, SRAM, and DRAM.

As shown in FIG. 2, the memory 136 may include several categories of software and data used in the component 200: an operating system 252; application programs 254; input/output (I/O) device drivers 258; and data 256. As will be appreciated by those of skill in the art, the operating system 252 may be any operating system suitable for use with a data processing system, such as OS/2, AIX or zOS from International Business Machines Corporation, Armonk, N.Y., Windows95, Windows98, Windows2000, WindowsXP, or WindowsCE from Microsoft Corporation, Redmond, Wash., Palm OS, Symbian OS, Cisco IOS, VxWorks, Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features according to embodiments of the invention. The data 256 represents the static and dynamic data used by the application programs 254, the operating system 252, the I/O device drivers 258, and other software programs that may reside in the memory 136.

According to FIG. 2, the application programs 254 include a verifier 265, a security controller 270, and Web services 280. The verifier 265 can request or retrieve verification reports, and/or receive proactively transmitted verification reports, associated with performance of requested actions on the component 200 itself and/or associated with actions performed by other components 200. The reports can be used by the verifier 265 to determine scores associated with the performance of actions requested of the respective component 200 on which the actions are carried out.

The security controller 270 can request or retrieve security reports, and/or receive proactively transmitted security reports, associated with requested actions carried out by the component 200 and/or actions carried out by other components 200. The security controller 270 can also determine security scores based on the reports. The verifier and security reports can be combined to provide a composite score that reflects the operational status of the distributed application environment in which the requested actions are carried out by the components 200. Therefore, the verifier 265 and security controller 270 can operate to monitor the performance of actions by separate components in the environment to determine operational status information that is based on the reports.

It will be understood that the applications program 254 can include Web services 280. Web services 280 can provide e-business applications by publishing an associated URL (Universal Resource Locator) in a well known UDDI directory. A client can then obtain the URL from the UDDI registry and contact the e-business using the URL in order to obtain a WSDL document. The WSDL document describes the interface provided for clients by the service e-business application, one or more transport mechanisms, for example, SOAP over HTTP (HyperText Transport Protocol), and an end point address for each transport mechanism. Once a client has the WSDL document it can invoke the interface via the specified end point using the specified transport mechanism. Further, if the client has an e-business application with which the service e-business application may wish to communicate the client and service may exchange WSDL documents in order to make this possible. Therefore, some embodiments according to the invention can be used to provide verification and security monitoring of applications operating in a Web service type of networked environment.

The Web service 280 can also provide functions in what are commonly referred to as single sign-on aggregated systems and federated identity systems. Some examples of these systems include the .NET Passport system ("Passport") made available by Microsoft, Inc. of Redmond, Wash. and the Liberty system ("Liberty") made available by Sun MicroSystems, Inc. of Mountain View, Calif. The Passport system provides for authentication of a user by creating a set of credentials that enable the user to sign-on to any of the services (such as that offered by a website) that supports the Passport service. According to the Passport system, a user can access the Passport system using a component 200 by signing-onto a service provider that is included in the distributed application environment that provides the Web services. The service provider can redirect the user's sign-on to the Passport server, whereupon the user signs-on to a Passport server. The Passport server can authenticate the user's sign-on information using locally accessible user identity information. If the user's sign-on information is authenticated, the user is redirected from the Passport server back to the service provider, whereupon the service provider can allow the user to access the Web services provided thereon.

The Liberty system can provide access to service providers and an identity server. In particular, a user can sign-on to a service provider and is redirected to the identity server, whereupon the user signs on using identity information available to the identity server. The identity server uses the identity information to determine whether the user (identified by the identity information) is an authentic user known to the service provider. If the identity server is able to verify the authenticity of the user, electronic credentials are provided, and the user is redirected back to the service provider, whereupon the user is able to access the Web services via that service provider.

As used herein, the term "Web service provider" can include a server that offers one or more services via, for example, Web pages as part of a Web site. The Web site can include a related collection of files that includes a beginning file called a home page. From the home page, a user can access other files and applications at the Web site. A large Web site may utilize a number of servers, which may or may not be different and may or may not be geographically dispersed.

Some embodiments according to the invention can operate in a logically separated client side/server side computing environment, sometimes referred to hereinafter as a client/server environment. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, that requests information, such as web pages, from a server under the control of a user. Examples of clients include browsers such as Netscape Navigator® (America Online, Inc., Dulles, Va.), Internet Explorer® (Microsoft Corporation, Redmond, Wash.), Opera, and open source Mozilla Firefox. Browsers typically provide a graphical user interface for retrieving and viewing web pages, web portals, applications, and other resources served by Web servers. A SOAP client can be used to request web services programmatically by a program in lieu of a web browser.

The applications provided by the Web service providers may execute on a server. The server can be a program that responds to the requests from the client. Some examples of servers are International Business Machines Corporation's family of Lotus Domino® servers, the Apache server and Microsoft's Internet Information Server (IIS) (Microsoft Corporation, Redmond, Wash.). The clients and servers can communicate using a standard communications mode, such as Hypertext Transport Protocol (HTTP) and SOAP. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. In the SOAP model the request and response are communicated through XML (Extensible Markup Language) message exchange. It will be understood that the server can respond to requests from more than one client.

Referring still to FIG. 2, the data 256 can include static and dynamic verification data 259 and security data 260. The verification data 259 can include data associated with algorithms, contexts, historical data, and the like which can be used to determine interim and final verification scores associated with the performance of requested actions by components in the environment. It will also be understood that verification data 259 can include a verification log that records the verification reports and may be accessed by the security controller 270.

The security data 260 can include profile data, algorithmic data, historical data, suspicious activity detection & identification data, security event correlation data, alarm threshold data, and preventive action data. The verification data 259 and security data 260 can be used by the verifier 265 and security controller 270 to process the verification and security reports reported or retrieved from components 200 performing requested actions.

Figure 3:
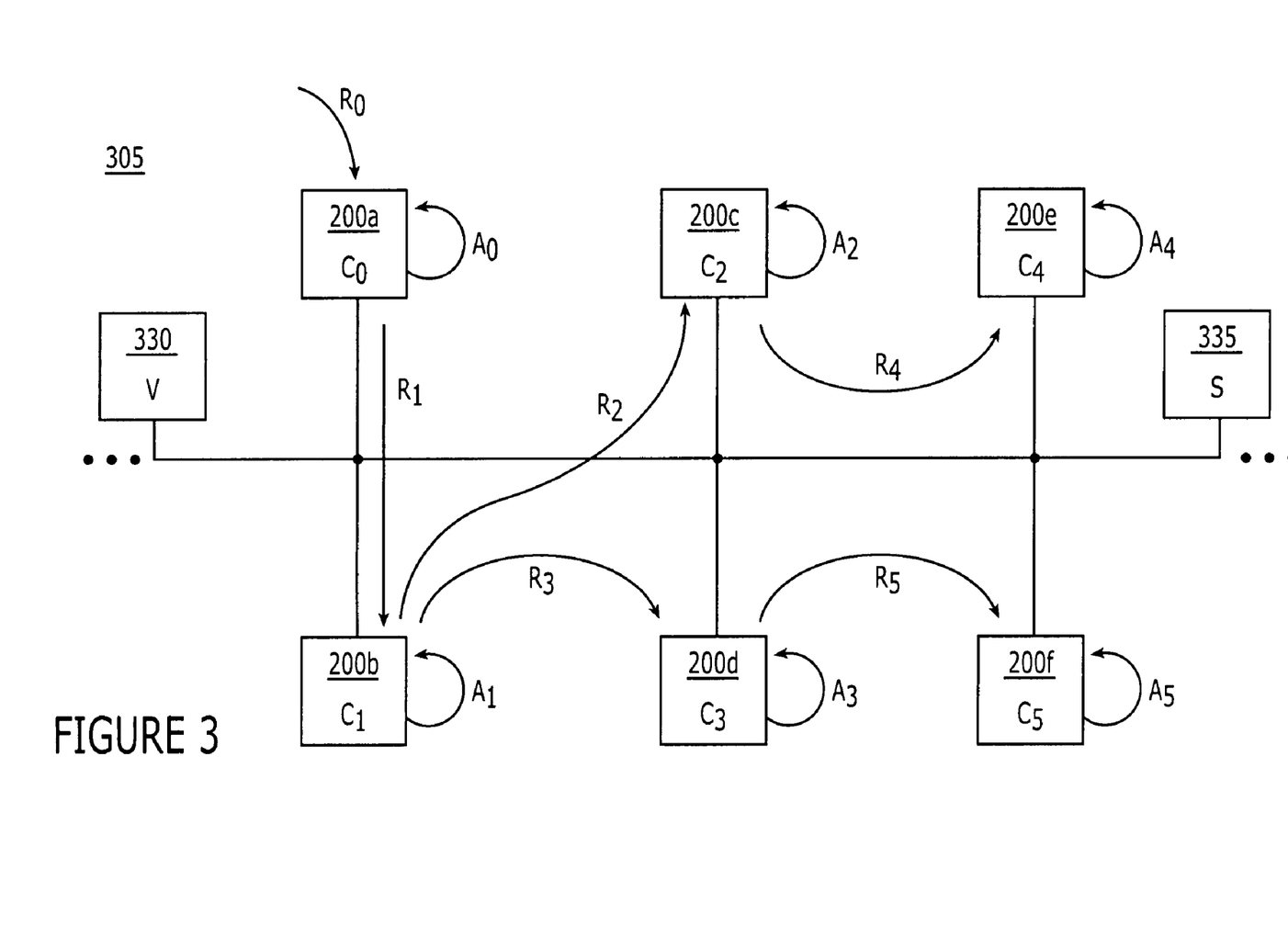
FIGS. 3-7 are a block diagrams that illustrate a distributed application environment including components configured to carry out operations according to some embodiments of the invention.

FIG. 3 is a block diagram that illustrates the operation of components 200a-f according to some embodiments of the invention. In particular, a user request R0 is provided to a component 200a included in the distributed application environment 305. The component 200a can perform actions A0 in response to the request R0 to accomplish a final result. The component 200a can also request actions to be performed by separate components 200b-f also included in the distributed application environment 305. It will be understood that as used herein, the term separate component includes components connected via one or more communication channels or networks, which can be administered separately. Such separate components 200a-f may provide, for example, separately available Web services such as those described herein.

The component 200a can in-turn make a further request R1 to component 200b, which may carry out respective actions thereon in response to the request R1. The separate component 200b may further issue other multiple requests R2 and R3 to two separate components 200c and 200d, respectively. Likewise, the separate components 200c and 200d may carry out their own respective actions in response to the request R2 and R3 and may further issue separate requests to components 200e and 200f, respectively. Similarly, the separate components 200e and 200f may also initiate respective actions thereon. Accordingly, the requested operation R0 made by a user can lead to numerous dependent requests between separate components 200a-f.

It will be understood that the actions carried out by each of the separate components 200a-f can yield intermediate as well as final results. For example, the separate component 200e can generate both interim and final results associated with the request R4 made by component 200c. The interim results can include the results of each atomic operation performed by the separate component 200a (or 200b, 200c, 200d, 200e, or 200f) until all conditions specified for the completion of the request R4 have been achieved, whereupon the separate component 200e may generate a final result of the request R4. It will be further understood that each of the separate components 200a-f can provide interim as well as final results based on respective requests made to each.

The distributed application environment 305 also includes logical representations of a verifier 330 and a security controller 335. The verifier 330 is capable of requesting or retrieving, or otherwise receiving, verification reports from each of the separate components 200a-f in the distributed application environment 305. For example, the verifier 330 can request an interim report from the separate component 200e based on the request R4. Alternatively, the separate component 200e may be instructed to transmit the verification report at predetermined intervals or upon reaching predetermined milestones associated with the request R4, and/or to transmit its verification status upon each significant internal change in that status, and/or to transmit its verification status upon reaching a particular pre-defined internal state. It will be understood that although the verifier 330 is shown separately, the representation is logical and not physical. In other words, the verifier 330 can be provided by yet another separate component 200 included in the distributed application environment 305 or, alternatively, as part of the separate components 200a-f as discussed herein further below.

Similarly, the security controller 335 is represented as a logical component of the distributed application environment 305. It will be understood that the security controller 335 can also be implemented in a distributed fashion as part of some or all of the separate components 200a-f included in the distributed application environment 305. As discussed above, the verifier 330 and security controller 335 can monitor the performance of actions by the separate components 200a-f to determine operational status information based on reports requested or provided by the verifier 330 and/or the security controller 335.

Figure 4:
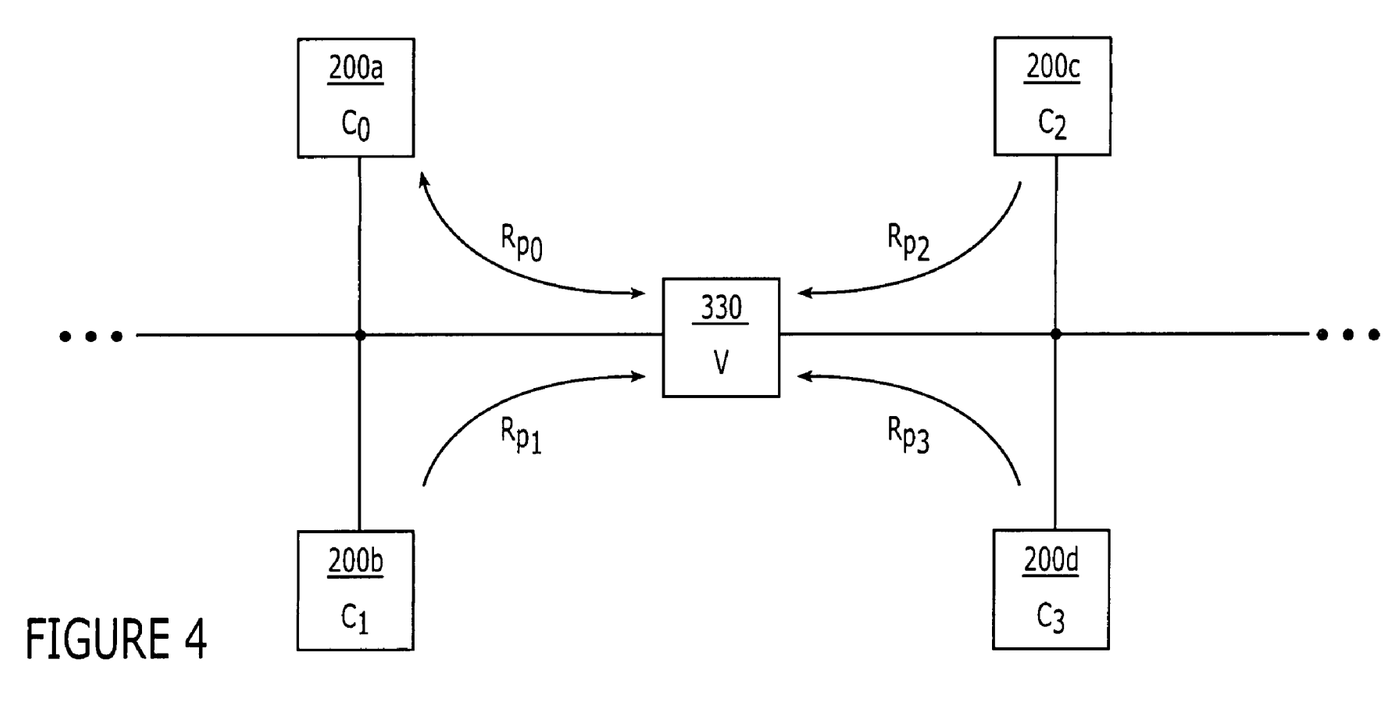

FIG. 4 is a block diagram of the verifier 330 shown in FIG. 3 according to some embodiments of the invention. In particular, the verifier 330 is configured to receive reports RP0-3 provided by each of the respective separate components 200a-d. It will be understood that the verifier 330 can remotely retrieve the verification reports RP0-3 at the separate components 200a-d and/or may receive the reports RP0-3 from the separate components without a specific request therefore. For example, the separate components 200a-d may send the verification reports RP0-3 to the verifier 330 at predetermined times or upon reaching predetermined milestones associated with the actions to be provided by the separate components 200a-d. Therefore, the verification reports RP0-3 may be provided at different times depending on which actions the separate components 200a-d are assigned.

The verification reports RP0-3 can be an interim verification report that reflects the status of the separate components 200a-d prior to final completion of the actions to performed. The verification reports RP0-3 can also be final verification reports that reflect the status of the separate components 200a-d after completion of their assigned actions. It will be understood that the verification reports (whether they be interim or final) can include status information that generally reflects operations of the separate components 200a-d. For example, the verification reports can include context information that reflects other operations that were carried out simultaneously with the requested actions. The verification reports can also include external events that are observed by the respective separate component 200a-d observed during execution of the requested action. Furthermore, the verification report can include operational information such as exceptions occurring during requested actions, system availability information, information related to overhead (such as interrupts), and other types of input/output performed by the separate components 200a-d.

The verifier 330 can use the interim and final verification reports to provide the verification score that reflects operational status of the separate components 200a-d providing the reports. The verification scores can be determined using, for example, a rules-based approach commonly referred to as "if-then-else" type rules, which can be used to make observations about system performance based on generally known causal relationships in the distributed application environment 305. The verification scores can also be based on historical data collected in association with similar actions carried out by the same (or a typical) separate component 200a-d. The verification report may therefore indicate operational status relative to what has been historically observed particularly when compared to negative system performance historically observed in the context of the same types of actions.

Figure 5:
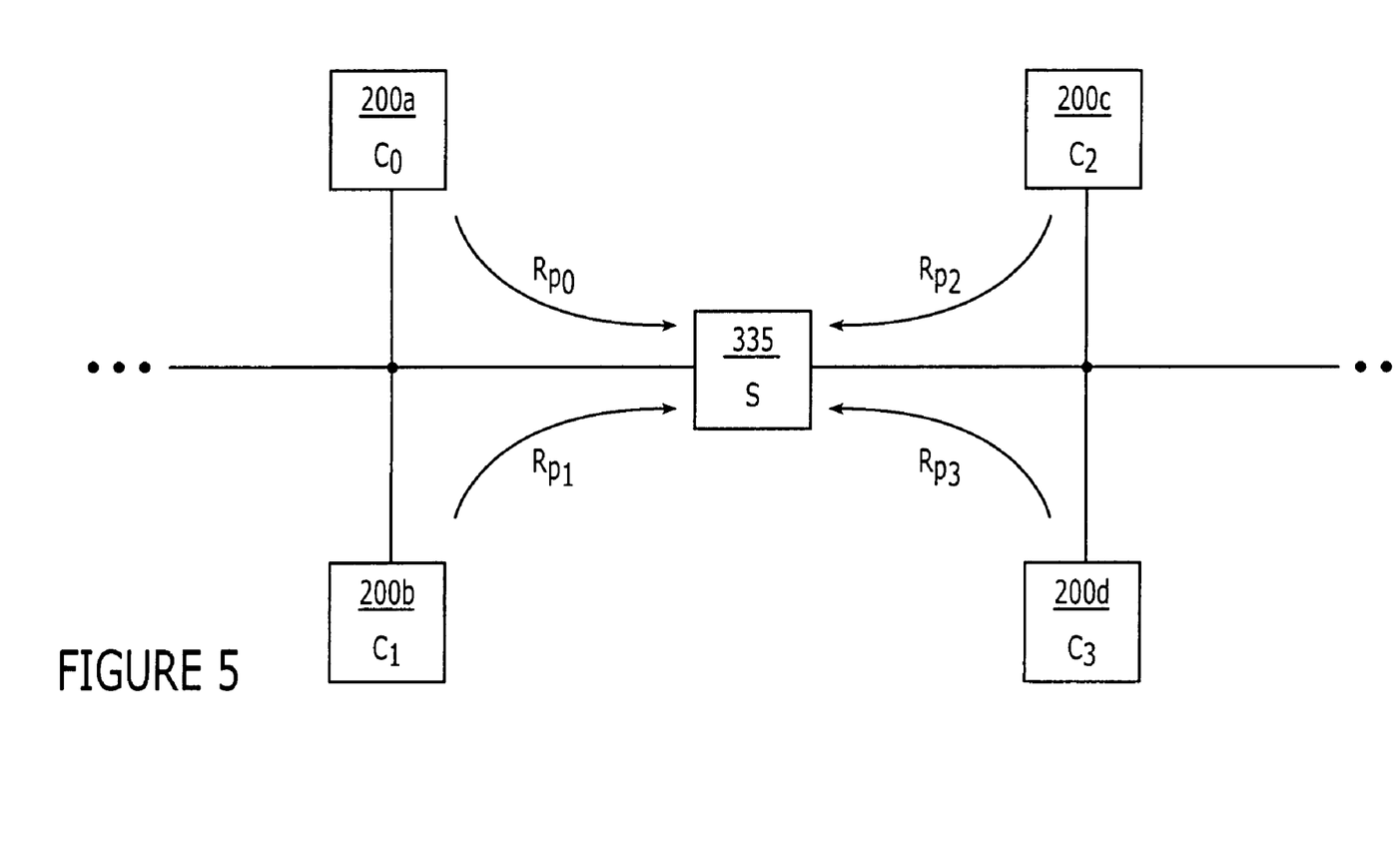

FIG. 5 is a block diagram that illustrates the security controller 335 shown in FIG. 3 according to some embodiments of the invention. In particular, the security controller 335 can request or retrieve or otherwise receive security reports RP0-3 from separate components 200a-d. Similar to the verification reports discussed above in reference to FIG. 4, the security controller 335 can receive security reports generated by the separate components 200a-d to determine security scores based thereon. The security report can include information related to the security associated with the separate components 200a-d during performance of the requested actions performed thereon. The security reports can include, for example, information related to which users are currently accessing respective separate components 200a-d and for what purposes or functions, information related to detected viruses or other threats, information related to detected spoofing or other suspicious activity, information related to failed logins at the separate component 200a-d, and the like.

As discussed above, the verification report and the security report can be combined to provide a composite report that reflects the overall operational status of the separate components 200a-f included in the distributed application environment 305. Furthermore, the combination of security and verification may be manifested as an overall score wherein the verification score and the security score are combined to create a composite score that reflects overall operational information associated with the distributed application environment 305. It will be understood that in some embodiments according to the invention, or under certain conditions in some embodiments, one of the scores may be more heavily weighted than the other score in order to determine a more accurate representation of the operational status of the distributed application network 305. For example, when it is known that particularly sensitive actions are being performed, the security score may be more heavily weighted than the verification score.

Alternatively, in situations where the actions to be carried out require high reliability, the verification score may be more heavily weighted than the security score. Accordingly, the composite score may be generated based on the type of actions to be carried in the distributed application environment 305. Furthermore, reports from some of the separate components 200a-d may be more heavily weighted than reports from other separate components. For example, according to FIG. 5, security reports from separate components 200a-b may be more heavily weighted than security scores provided from separate components 200c-d if it is known that the actions carried out by separate components 200a-b are more sensitive and/or more important to achieving & maintaining security than those carried out by separate components 200c-d.

Furthermore, according to FIG. 4, some verification reports may be more heavily weighted than others depending on which separate components in the system is deemed to perform operations which require higher reliability. For example, the verification reports RP0 and RP1 provided by separate components 200a-b in FIG. 4 may be more heavily weighted than other reports if it is determined that the actions performed by separate components 200a-d are more critical, e.g. in terms of successful completion, than actions carried out by other separate components.

Figure 6:
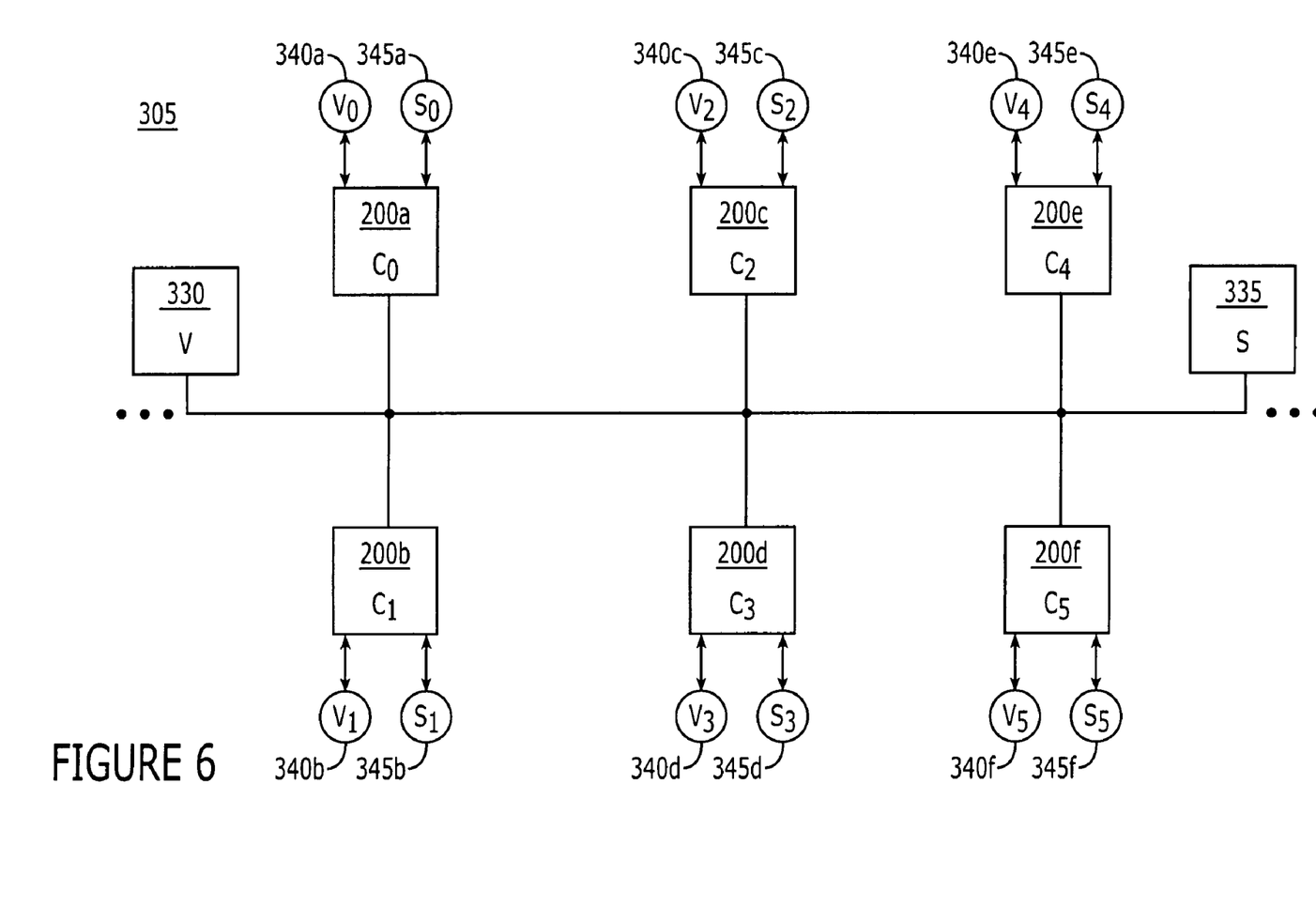

FIG. 6 is a block diagram that illustrates separate component 200a-f having associated respective verifiers 340 and security controllers 345 according to some embodiments of the invention. In particular, the separate components 200a-f have associated respective verifiers 340a-f and security controllers 345a-f. The verifiers 340a-f and security controllers 345a-f represent a distributed form of the verifier 330 and security controller 335 shown in FIG. 3. Therefore, according to some embodiments of the invention, the verification and security reports can be provided locally by the respective separate component 200a-f. For example, during the performance of requested actions, the separate component 200b can report verification information to the local verifier 340b. Furthermore, the security reports can be provided to the local security controller 345b. The verification and security reports can be provided on an interim basis and/or on a final basis so that local interim and/or final scores may be calculated based on the actions carried out by the separate component 200b. Similar actions may be carried out relative to the remaining separate components included in the distributed application environment 305. Upon completion, each of the scores (or reports) can be provided to a centralized verifier 330 and centralized security controller 335 whereupon overall verification and security scores can be determined for the entire distributed application environment 335.

Figure 7:
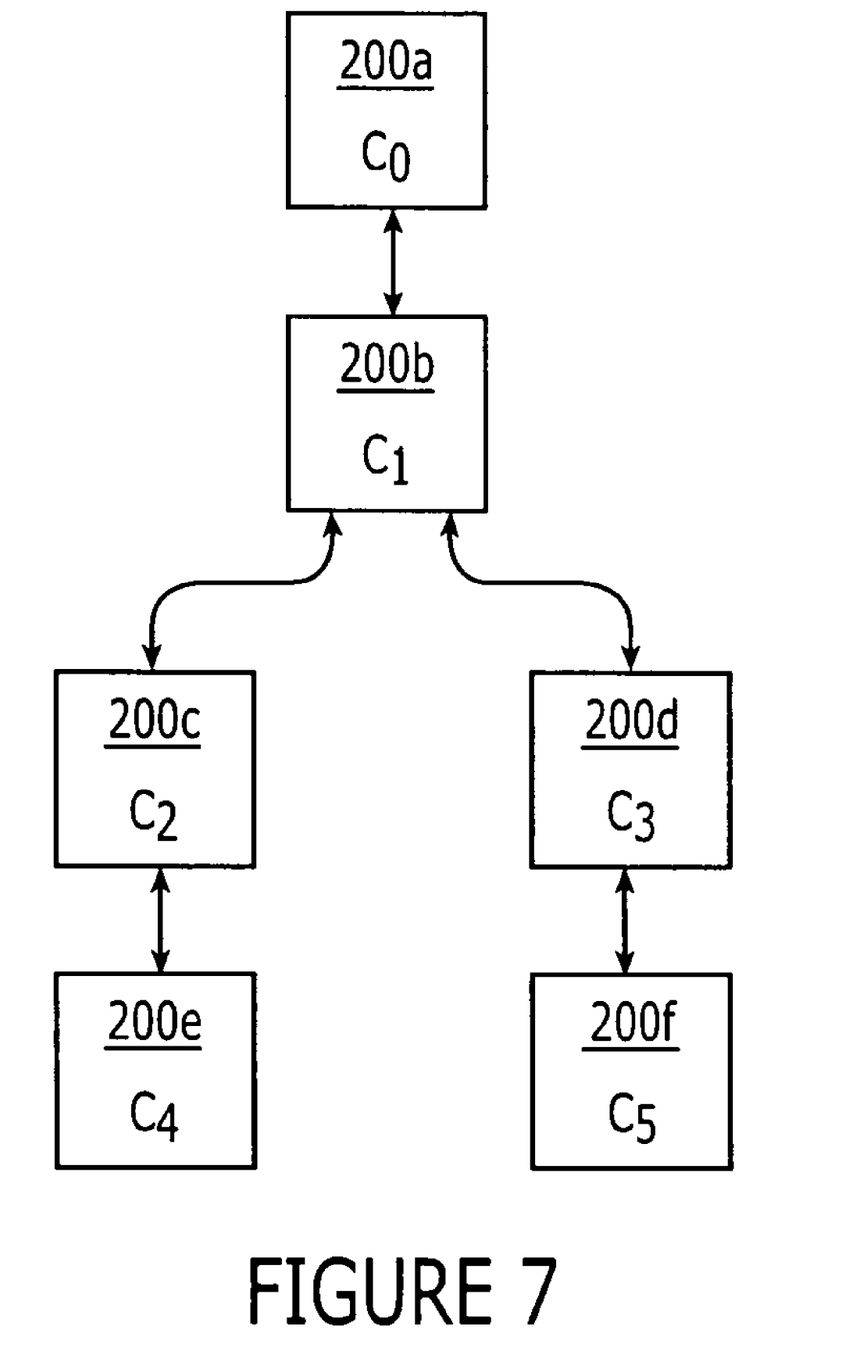

FIG. 7 is a hierarchical block diagram illustrating hierarchical relationship between different ones of the separate components 200a-f. In particular, separate components 200a-f are drawn in a hierarchical relationship represented by the request issued by the separate components as shown in FIG. 3. For example, separate component 200a is drawn at the highest level of the hierarchy as all requests issued to the other separate components 200b-f stem from the initial request made to the separate component 200a. Similarly, separate component 200*b* issues two requests: a first request to separate component 200*c* and a second request to separate component 200*d*.

Each of these components in turn issues requests to separate component 200*e* and 200*f*, respectively. Accordingly, verification and security reports can be provided and/or retrieved by the next highest level separate component in the hierarchical structure found in FIG. 7. For example, separate components 200*e-f* can provide verification and security reporting to separate components 200*c-d*, respectively, as these components are located at the immediately higher level of the hierarchy. Accordingly, the verification and security scoring can be provided on a hierarchical basis which may enable the distributed application environment 305 to be scaled more widely as, for example, the number of Web services available in the distributed application environment 305 is increased.

Figure 8:
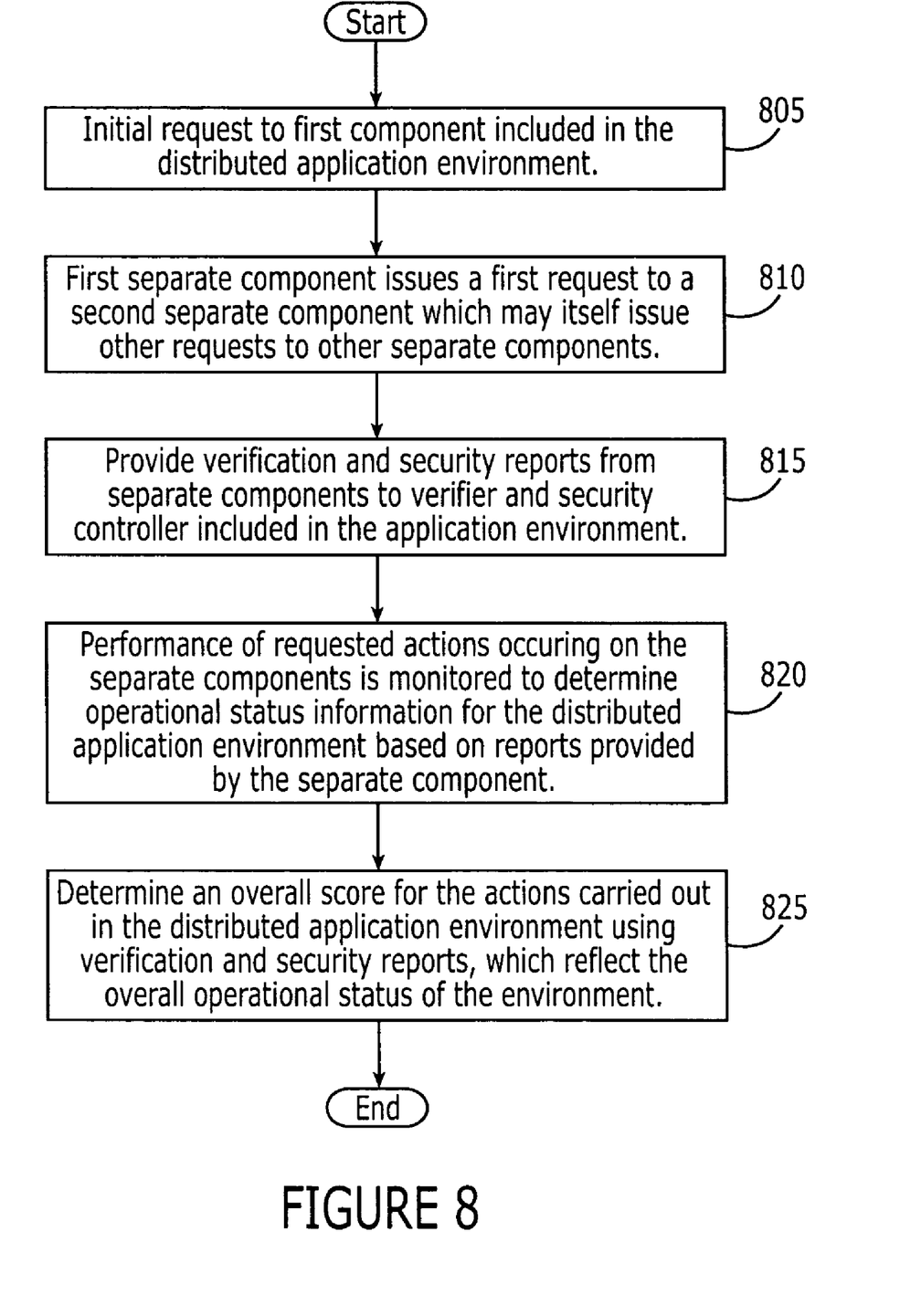
FIG. 8 is a flowchart that illustrates operations of components according to some embodiments of the invention.

FIG. 8 is a flowchart that illustrates operations of methods, systems, and computer program products according to some embodiment of the invention. In particular, an initial request is issued to a first component included in the distributed application environment (block 805). The first separate component issues a first request to a second separate component which may itself issue other requests to other separate components included in the distributed application environment (block 810). The separate components can provide verification and security reports to a centralized verifier and a centralized security controller included in the application environment (block 815). The performance of the actions occurring on the separate components may be monitored to determine operational status information for the distributed application environment based on reports provided by the separate components (block 820). Alternatively, the reports can be provided to different verifiers and security controllers in a distributed fashion and/or in a hierarchical fashion.

The verification and security reports can be used to determine an overall score for the actions carried out for the distributed application environment, which reflects the overall operational status of the environment (block 825). The verification and security scores can be combined to provide a composite score. The score may be used to determine whether adaptive and/or preventive-type action may be advisable in the distributed application environment so as to avoid potential reliability and/or security issues.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method for providing operational status information associated with a distributed application environment comprising:

monitoring performance of actions occurring on separate components in a distributed application environment in response to a requested action at a separate component to determine operational status information of the distributed application environment based on reports provided by the separate components, wherein the requested action further comprises a series of requested actions issued to a series of respective separate components wherein each of the respective separate components is at a different level of a hierarchy with in the distributed application environment, each of the respective separate components generating respective verification and security reports provided from ones of the respective separate components at a lower level of hierarchy to ones of the respective separate components at a higher level of hierarchy within the distributed application environment, wherein the respective verification reports include information on exceptions occurring on the respective separate components during requested actions and the respective security reports include information on which users were accessing the respective separate components during requested actions.

2. A method according to claim 1 wherein the separate verification and security reports comprise respective separate verification and security scores.

3. A method according to claim 2 wherein determining the operational status information based on separate verification and security scores comprises determining the separate verification and security scores based on separate verification and security reports provided by the separate components.

4. A method according to claim 3 wherein the separate verification and security scores comprise respective numerical scores that are directly or indirectly proportional to separate verification and security status.

5. A method according to claim 2 wherein the verification reports comprise objective parameters of processor usage, execution time, exception occurrences, time outs, context information and/or message flow state information.

6. A method according to claim 5 further comprising determining the verification score based on mapping the objective parameters using historical data and/or rule based data.

7. A method according to claim 2 wherein the security reports comprise objective parameters of failed login attempts, user identifiers, application usage information, current configuration, active functions/capabilities, system impairment/crash information, and/or message flow state information.

8. A method according to claim 7 further comprising determining the security score based on mapping the objective parameters using historical security event/violation data, pattern matching and/or rule based data.

9. A method according to claim 8 further comprising:
evaluating the security score against a security threshold value; and
activating a security alarm if the security score exceeds the security threshold value.

10. A method according to claim 9 wherein the security threshold is modified based on the verification score.

11. A method according to claim 10 wherein the security threshold is modified based on a request type.

12. A method according to claim 1 wherein monitoring performance of actions further comprises determining the operational status information based on hierarchical reporting by the separate components.

13. A method according to claim 1 wherein the reports comprise interim reports indicating operational status information associated with performance of the action before completion of the action by respective ones of the separate components and final reports indicating operational status information associated with performance of the action after completion of the action by the respective ones of the separate components.

14. A method according to claim 13 further comprising determining intermediate and final verification and security scores for the distributed application environment based on interim reports from different components.

15. A method according to claim 1 further comprising:
receiving the request from a user;
translating a request from a user to at least one need to be satisfied;

identifying at least one of the components to be used to satisfy the at least one need; and scheduling execution of actions by the identified at least one of a plurality of application service providing modules to satisfy the at least one need.

16. A system for providing operational status information associated with a distributed application environment comprising:

means for monitoring performance of actions occurring on separate components in a distributed application environment in response to a requested action to determine operational status information of the distributed application environment based on reports provided by the separate components, wherein the requested action further comprises a series of requested actions issued to a series of respective separate components wherein each of the respective separate components is at a different level of a hierarchy with in the distributed application environment, each of the respective separate components generating respective verification and security reports provided from ones of the respective separate components at a lower level of hierarchy to ones of the respective separate components at a higher level of hierarchy within the distributed application environment, wherein the respective verification reports include information on exceptions occurring on the respective separate components during requested actions and the respective security reports include information on which users were accessing the respective separate components during requested actions.

17. A system according to claim 16 wherein the separate verification and security reports comprise respective separate verification and security scores.

18. A system according to claim 17 wherein means for determining the operational status information based on separate verification and security scores comprises means for determining the separate verification and security scores based on separate verification and security reports provided by the separate components.

19. A system according to claim 18 wherein the separate verification and security scores comprise respective numerical scores that are directly or indirectly proportional to separate verification and security status.

20. A system according to claim 18 further comprising means for determining intermediate and final verification and security scores for the distributed application environment based on interim reports from different components.

21. A system according to claim 17 wherein the verification reports comprise objective parameters of processor usage, execution time, exception occurrences, time outs, context information and/or message flow state information.

22. A system according to claim 21 further comprising means for determining the verification score based on mapping the objective parameters using historical data and/or rule based data.

23. A system according to claim 17 wherein the security reports comprise objective parameters of failed login attempts, user identifiers, application usage information, current configuration, active functions/capabilities, system impairment/crash information, and/or message flow state information.

24. A system according to claim 23 further comprising means for determining the security score based on mapping the objective parameters using historical security event/violation data, pattern matching and/or rule based data.

25. A system according to claim 24 further comprising:
evaluating the security score against a security threshold value; and
activating a security alarm if the security score exceeds the security threshold value.

26. A system according to claim 25 wherein the security threshold is modified based on the verification score.

27. A system according to claim 26 wherein the security threshold is modified based on a request type.

28. A system according to claim 16 wherein means for monitoring performance of actions further comprises means for determining the operational status information based on hierarchical reporting by the separate components.

29. A system according to claim 16 wherein the reports comprise interim reports indicating operational status information associated with performance of the action before completion of the action by respective ones of the separate components and final reports indicating operational status information associated with performance of the action after completion of the action by the respective ones of the separate components.

30. A computer program product for providing a computer displayable presentation comprising a computer readable medium having computer readable program code embodied therein, the computer readable program product comprising:

computer readable program code configured to monitor performance of actions occurring on separate components in a distributed application environment in response to a requested action to determine operational status information of the distributed application environment based on reports provided by the separate components, wherein the requested action further comprises a series of requested actions issued to a series of respective separate components wherein each of the respective separate components is at a different level of a hierarchy with in the distributed application environment, each of the respective separate components generating respective verification and security reports provided from ones of the respective separate components at a lower level of hierarchy to ones of the respective separate components at a higher level of hierarchy within the distributed application environment, wherein the respective verification reports include information on exceptions occurring on the respective separate components during requested actions and the respective security reports include information on which users were accessing the respective separate components during requested actions.

31. A computer program product according to claim 30 wherein the separate verification and security reports comprise respective separate verification and security scores.

32. A computer program product according to claim 31 wherein the computer readable program code configured to determining the operational status information based on separate verification and security scores comprises computer readable program code configured to determine the separate verification and security scores based on separate verification and security reports provided by the separate components.

33. A computer program product according to claim 32 wherein the separate verification and security scores comprise respective numerical scores that are directly or indirectly proportional to separate verification and security status.

34. A computer program product according to claim 32 further comprising computer readable program code configured to determine intermediate and final verification and security scores for the distributed application environment based on interim reports from different components.

35. A computer program product according to claim 31 wherein the verification reports comprise objective parameters of processor usage, execution time, exception occurrences, time outs, context information and/or message flow state information.

36. A computer program product according to claim 35 further comprising computer readable program code configured to determine the verification score based on mapping the objective parameters using historical data and/or rule based data.

37. A computer program product according to claim 31 wherein the security reports comprise objective parameters of failed login attempts, user identifiers, application usage information, current configuration, active functions/capabilities, system impairment/crash information, and/or message flow state information.

38. A computer program product according to claim 37 further comprising computer readable program code configured to determine the security score based on mapping the objective parameters using historical security event/violation data, pattern matching and/or rule based data.

39. A computer program product according to claim 38 further comprising:
computer readable program code configured to evaluate the security score against a security threshold value; and
computer readable program code configured to activate a security alarm if the security score exceeds the security threshold value.

40. A computer program product according to claim 39 wherein the security threshold is modified based on the verification score.

41. A computer program product according to claim 40 wherein the security threshold is modified based on a request type.

42. A computer program product according to claim 30 wherein computer readable program code configured to monitor performance of actions further comprises computer readable program code configured to determine the operational status information based on hierarchical reporting by the separate components.

43. A computer program product according to claim 30 wherein the reports comprise interim reports indicating operational status information associated with performance of the action before completion of the action by respective ones of the separate components and final reports indicating operational status information associated with performance of the action after completion of the action by the respective ones of the separate components.

* * * * *